(12) United States Patent
Toyoda et al.

(10) Patent No.: US 6,404,546 B2
(45) Date of Patent: Jun. 11, 2002

(54) INVERTED MICROSCOPE

(75) Inventors: Shuji Toyoda, Chigasaki; Takashi Kawahito, Fujisawa, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/827,906

(22) Filed: Apr. 9, 2001

Related U.S. Application Data (62) Division of application No. 09/116,247, filed on Jul. 16, 1998, now Pat. No. 6,239,905.

(30) Foreign Application Priority Data

Aug. 27, 1997 (JP) .............................................. 9-244864

(51) Int. Cl.$^7$ ........................ G02B 21/26; G02B 21/00
(52) U.S. Cl. ...................... 359/392; 359/368; 359/383
(58) Field of Search ................................. 359/368, 370, 359/380–395, 821; D16/131

(56) References Cited

U.S. PATENT DOCUMENTS

| | | | |
|---|---|---|---|
| 4,210,384 A | 7/1980 | Meyer et al. | ............. 359/385 |
| 4,688,908 A * | 8/1987 | Moore | ................. 359/393 |
| 4,756,611 A | 7/1988 | Yonekubo et al. | ........... 359/368 |
| 5,270,855 A * | 12/1993 | Hasegawa | ................ 359/383 |
| D356,804 S * | 3/1995 | Hofmann-Igl | ............. D16/131 |
| 5,530,237 A * | 6/1996 | Sato et al. | ................. 359/383 |
| 5,870,222 A * | 2/1999 | Yamamoto et al. | ........ 359/393 |
| 6,160,662 A * | 12/2000 | Uchida et al. | .............. 359/390 |

FOREIGN PATENT DOCUMENTS

| | | | |
|---|---|---|---|
| CH | 480648 | * 12/1969 | ............... 359/392 |
| JP | 1-31110 | * 2/1989 | ............... 359/383 |

* cited by examiner

*Primary Examiner*—Thong Nguyen
(74) *Attorney, Agent, or Firm*—Miles & Stockbridge P.C.

(57) ABSTRACT

An inverted microscope has a microscope base, a stage, an observation optical system, a stage support structure which is arranged on the microscope base and supports the stage, and a switching structure having a plurality of objective lenses and capable of inserting one of the objective lenses into an optical path of the observation optical system selectively. A support structure is fixed to a lower surface of the stage and supports the switching structure for movement in an optical axis direction of the objective lens inserted in the optical path of the observation optical system.

2 Claims, 7 Drawing Sheets

INVERTED MICROSCOPE

CROSS-REFERENCE TO RELATED APPLICATION

This application is a division of application Ser. No. 09/116,247 filed Jul. 16, 1998, now U.S. Pat. No. 6,239,905.

BACKGROUND OF THE INVENTION

1. Field of the Invention

The present invention relates to an inverted microscope.

2. Related Background Art

In a conventional inverted microscope, an objective lens and a revolver for fixing the objective lens are disposed below a stage. In epi-fluorescent observation, a specimen is observed by attaching an epi-fluorescent device to a space assured in advance. As a light source for the epi-fluorescent device, a mercury lamp or xenon lamp is normally used. As disclosed in U.S. Pat. No. 4,756,611, a microscope capable of switching from the epi-fluorescent device to another device is known to those who are skilled in the art.

In recent years, it is required to simultaneously use a confocal optical system, caged reagent cleaving optical system, laser manipulation optical system, and the like together with the epi-fluorescent device depending on the specimen to be observed.

However, in the conventional inverted microscope, since the two end portions of the stage are fixed to the base of the microscope, the positional relationship between the stage and the base in their height direction cannot be changed. For this reason, no new optical system other than the epi-fluorescent device can be added onto the optical axis of the objective lens. If an output port is provided to the side surface of the microscope base, an additional optical system may be attached thereto. However, if this is done, since the additional optical system extends from the side surface of the microscope base, the apparatus becomes bulky.

SUMMARY OF THE INVENTION

It is an object of the present invention to provide an inverted optical system in which a plurality of optical systems (optical units) can be located on the optical axis of the objective lens.

In order to achieve the above object, an inverted microscope according to the present invention comprises:

a microscope base;

a stage;

an observation optical system having an objective lens;

a stage support member which is arranged on the microscope base and supports the stage at two ends; and a change member which can change a level position of the stage with respect to the microscope base.

According to the inverted microscope of the present invention, since the level of the stage with respect to the microscope base can be changed, a new space can be formed between the stage and microscope base. Hence, a plurality of required optical systems (optical units) can be stacked in this space. As a result, various kinds of observation can be made using various optical systems in the inverted microscope, thus broadening the range of utilization of the inverted microscope.

The objective lens converts light received from a specimen placed on the stage into a collimated light beam (or parallel rays), the observation optical system has an imaging lens which is arranged inside the microscope base, and focuses the collimated light beam coming from the objective lens, and at least two housings, each for storing an optical path split element for splitting an optical path along an optical axis of the objective lens, can be inserted between the objective lens and the imaging lens.

The stage support member can be attached/detached to/from at least one of the stage and microscope base, and the change member may be a spacer member inserted between at least one of the stage and microscope base, and the stage support member.

The change member may have a guide provided to at least one of the microscope base and stage support member, and a movable member which is provided to at least one of the stage and stage support member, and is vertically movable along the guide together with the stage.

In the inverted microscope of the present invention, a light irradiation system or light-receiving system can be inserted in the optical path split by the optical path split element.

The inverted microscope may further comprise:

a revolver for holding the objective lens;

a holding member for rotatably holding the revolver; and a focusing member for vertically movably supporting the holding member with respect to the microscope base, and at least one of the housings each for storing an optical path split member can be inserted between the holding member and the focusing member.

The inverted microscope may further comprise:

a revolver for holding the objective lens;

a holding member for rotatably holding the revolver; and a support member, one end of which is fixed to a lower surface of the stage, and which supports the holding member at the other end thereof to be movable in an optical axis direction of the objective lens.

The inverted microscope may further comprise:

a transmission illumination system for transmission-illuminating a specimen placed on the stage;

an illumination arm which is arranged on the microscope base and supports the transmission illumination system; and an adjustment member which can adjust a position of the illumination arm in a direction of height thereof with respect to the microscope base.

Furthermore, the stage has a U-shaped section defined by a specimen placing portion and two leg portions formed on opposite end portions of the placing portion, and the two leg portions can be attached/detached to/from the stage support member.

An inverted microscope according to another aspect of the present invention comprises:

a microscope base;

a stage;

an observation optical system having an objective lens;

a stage support member for supporting the stage with respect to the microscope base;

a switching member having a plurality of objective lenses and capable of inserting one of the objective lenses into an optical path of the observation optical system selectively; and a support member, one end of which is fixed to a lower surface of the stage, and which supports the holding member at the other end thereof such that the holding member is movable in an optical axis direction of said one of the objective lenses.

According to the inverted microscope with this arrangement, since the relative positional relationship between the stage and objective lens remains the same even when the level of the stage has been changed, position adjustment of the objective lens upon changes in stage position is very easy. When a specimen is kept at a given temperature using a temperature control device such as a heating stage or the like, heat from the stage is conducted to the objective lens via the support member and holding member. Hence, the objective lens can be set at nearly the same temperature as the stage, and specimen observation can be performed while keeping the specimen at the preset temperature.

A stage for an inverted microscope according to still another aspect of the present invention comprises:

a specimen placing portion; and two leg portions formed on opposite end portions of the placing portion, wherein the stage has a U-shaped section, and the two leg portions can be attached/detached to/from a stage support member of an inverted microscope.

Since the stage with a U-section is used, the level position of the stage can be easily shifted upward.

DESCRIPTION OF THE PREFERRED EMBODIMENTS

Figure 1:
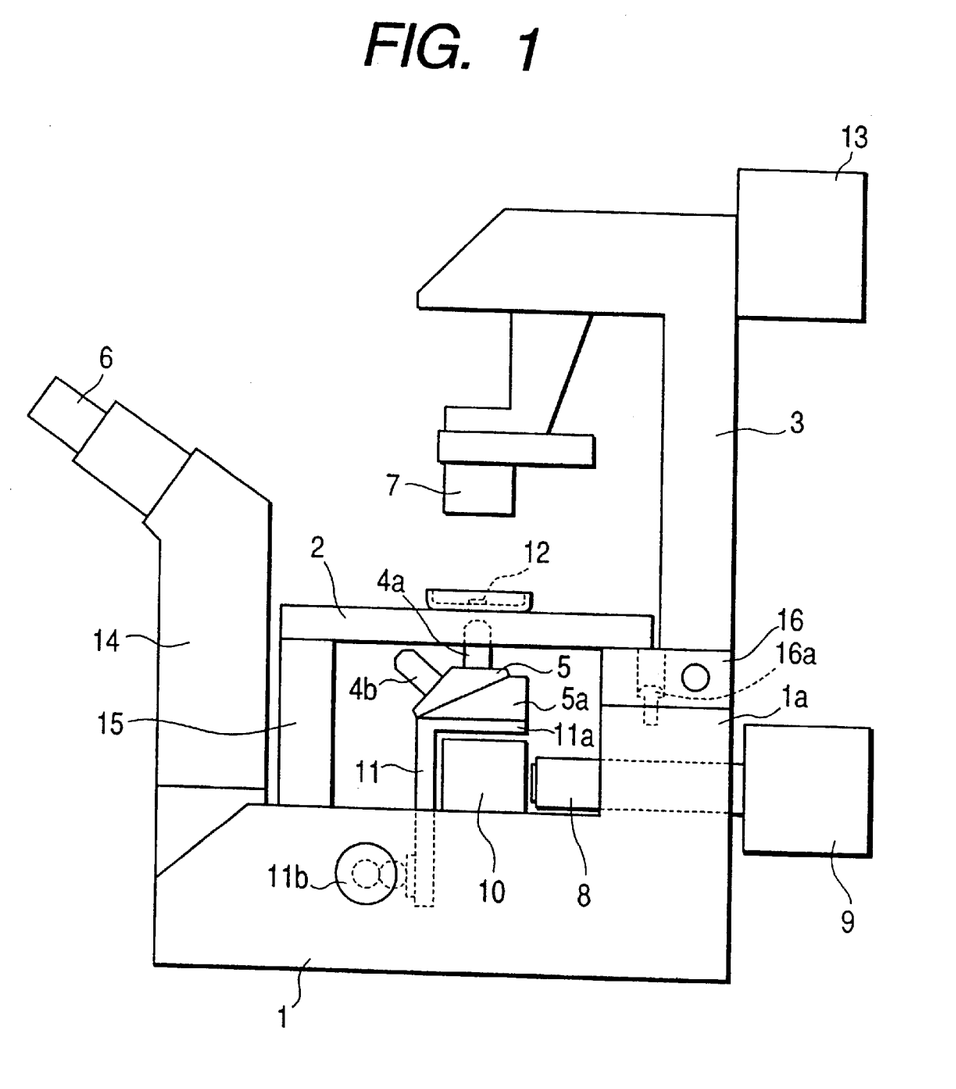
FIG. 1 is a side view showing an inverted microscope according to the first embodiment of the present invention.
Figure 2:
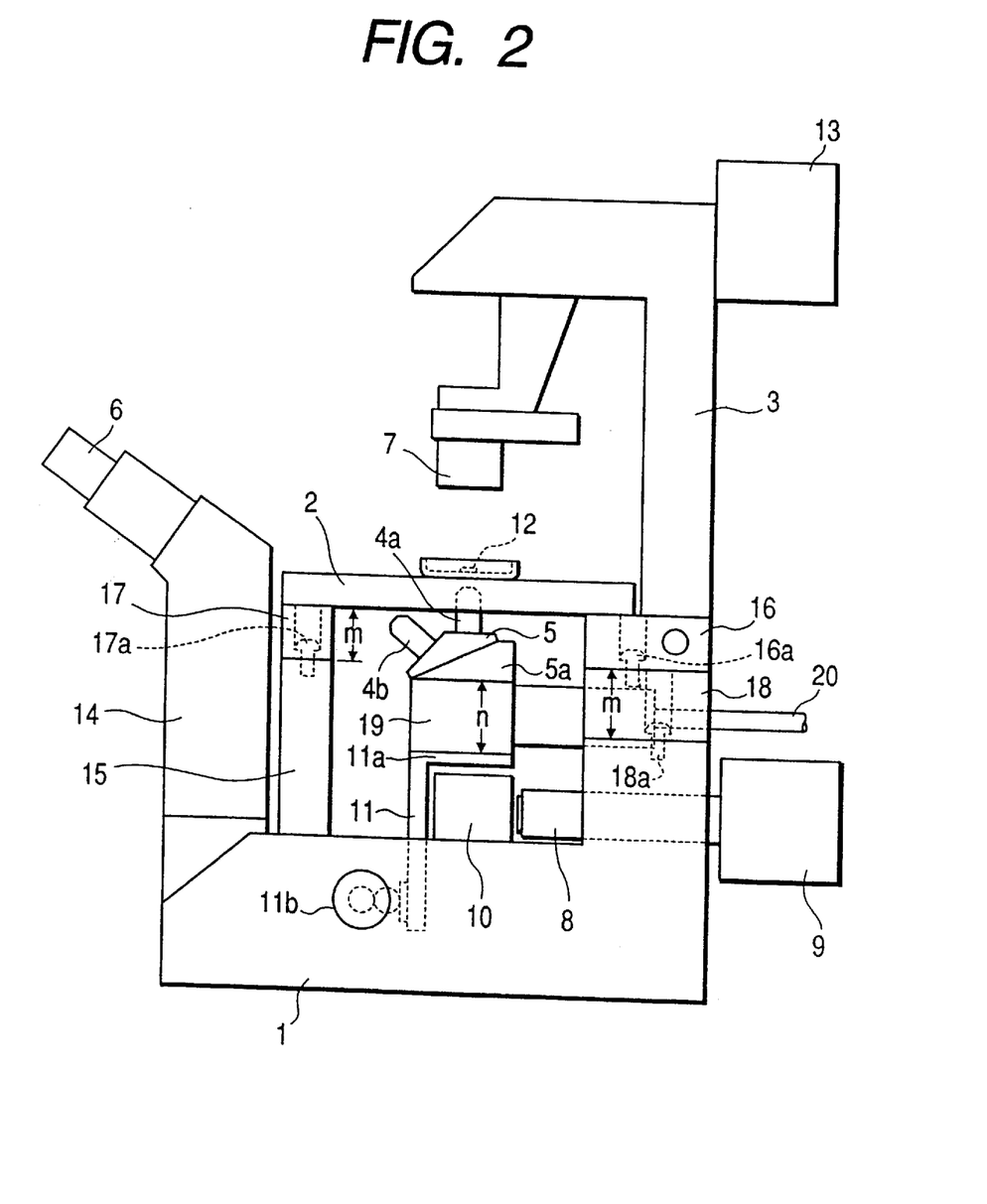
FIG. 2 is a side view showing a state wherein a new optical system is added to the inverted microscope of the first embodiment.

The first embodiment of the present invention will now be described with reference to the accompanying drawings. FIGS. 1 and 2 are side views showing an inverted microscope according to the first embodiment of the present invention. The inverted microscope shown in FIG. 1 comprises a microscope base 1, an eyepiece arm 14 which is disposed on the front surface side of the base 1 and supports an eyepiece 6, an illumination arm 3 which is disposed on the back surface side of the base 1 and supports a transmission illumination lamp housing 13 and other elements, a stage 2 for placing a specimen, a first stage support member 15 which extends vertically upward from the base 1 and detachably supports the stage 2, a projection 1a which is integrally formed on the back surface side of the base 1 and projects vertically upward, and a second stage support member 16 which is attached to the projection 1a via a screw 16a and detachably supports the stage 2. The illumination arm 3 is supported by the second stage support member 16.

The inverted microscope shown in FIG. 1 also comprises a plurality of objective lenses 4a and 4b disposed underneath the stage 2, a rotary revolver 5 for holding these objective lenses 4a and 4b to be able to switch them, a holding portion 5a for rotatably holding the revolver 5, and a focusing member 11 having a revolver support 11a for detachably supporting the holding portion 5a. The focusing member 11 extends vertically downward from one end of the revolver support 11a to the interior of the base 1, and engages with a rack & pinion mechanism built in the base 1. The rack & pinion mechanism is connected to a focusing knob 11b, and is moved vertically by rotating this focusing knob 11b. With this arrangement, the objective lens 4a inserted in the microscope optical path is vertically moved with respect to the stage 2 to its in-focus position.

In the inverted microscope shown in FIG. 1, an epi-fluorescent device for epi-fluorescent observation is mounted on the base 1. The epi-fluorescent device comprises a mercury lamp 9, a light projection tube 8 with an optical system for specimen illumination, and a filter unit 10. The filter unit is inserted in the space between the revolver support 11a and the base 1. The filter unit 10 includes a filter block for holding a dichroic mirror optical path splitting member), excitation filter, and absorption filter.

Illumination light originating from the mercury lamp 9 is irradiated onto the dichroic mirror in the filter unit 10 via the light projection tube 8. The illumination light reflected by the dichroic mirror is guided to the objective lens 4a, and is irradiated onto a specimen 12 in a petri dish.

The inverted microscope shown in FIG. 1 comprises a transmission illumination system which is constructed by the light source (lamp housing) 13 supported by the illumination arm 3 and a condenser lens 7 for focusing or converging light coming from the light source 13 onto the specimen 12. An imaging lens (not shown) is disposed in the base 1 below the filter unit 10. The objective lenses 4a and 4b form an infinity optical system. That is, light coming from the specimen 12 is converted into a collimated or parallel light beam by the objective lenses 4a and 4b, and is focused by the imaging lens, thus forming a specimen image. The specimen image is observed via the eyepiece 6.

A case will be explained below with the aid of FIG. 2, wherein a new light irradiation system is added in addition to the epi-fluorescent device.

From the state illustrated in FIG. 1, the stage 2 is detached from the first stage support member 15. The screw 16a is removed to detach the second stage support member 16 from the projection 1a of the base 1. At this time, the stage 2, second stage support member 16, and illumination arm 3 are removed from the base 1.

Subsequently, as shown in FIG. 2, a first spacer member 17 is attached to the upper end of the first stage support member 15 by a screw 17a. A second spacer member 18 is attached to the projection 1a by a screw 18a.

The second stage support member 16 is attached onto the second spacer member 18 by the screw 16a, and the stage 2 is attached to the first spacer member 17 and second stage support member 16.

The thicknesses of the first and second spacer members 17 and 18 in the vertical direction (the optical axis direction of the objective lens 4a) are of an equal value m. Hence, the level position of the stage 2 is shifted upward by m.

When the above-mentioned assembling processes are done in the reverse order, the stage 2 can return from the raised state (FIG. 2) to the lowered state (FIG. 1).

In this way, by appropriately interposing the spacer members between the stage support members and the stage or between the base and the stage support members, the stage 2 can be shifted in the optical axis direction of the objective lens 4a with respect to the base 1. As a result, a new space can be formed between the stage 2 and the filter unit 10 on the base 1.

A case will be explained below wherein a new optical system is inserted between the objective lens 4a and the filter unit 10.

The holding portion 5a of the revolver 5 is removed from the revolver support 11a of the focusing member 11, and an additional light irradiation system 19 is inserted between the holding portion 5a and the revolver support 11a. A thickness n of a housing that holds the additional light irradiation system 19 in the vertical direction (the optical axis direction of the objective lens 4a) is determined to be equal to or smaller than the thickness m of each of the first and second spacer members.

The light irradiation system 19 in this embodiment is, for example, a caged reagent cleaving device. The caged reagent cleaving device has a laser source (not shown). A laser beam emitted by this laser source is guided to the light irradiation system 19 via an optical fiber 20. The light irradiation system 19 has a dichroic mirror (optical path splitting member) on the optical axis of the objective lens 4a. This dichroic mirror as optical characteristics so that it passes illumination light coming from the epi-fluorescent device and fluorescence from a specimen, and reflects only the laser beam from the caged reagent cleaving device. The laser beam is reflected by the dichroic mirror, and is guided to the specimen 12 via the objective lens 4a.

The caged reagent cleaving device is used for observing a physiological phenomenon by introducing a caged compound into cells, and irradiating a laser beam spot or the like onto a cell portion under observation to cause it to partially emit physiologically active molecules. Hence, when the caged reagent cleaving device is used together with the epi-fluorescent device (8, 9, 10), fluorescent observation of the objective living body cell portion upon irradiation of a laser beam can be made.

To restate, according to the inverted microscope of this embodiment, since a device including a new optical system can be stacked and added in the optical axis direction of the objective lens in addition to the conventional epi-fluorescent device, another observation function can be provided by the additional device. Also, since the two devices can be used at the same time, various kinds of observation and experiments during observation can be made, thus broadening the range of utilization of the inverted microscope.

Since the thickness n of the housing of the additional light irradiation system 19 in the optical axis direction is set to be equal to or smaller than the thickness m of each of the first and second spacer members, the objective lens never interferes with the stage, and does not disturb focusing of the microscope during observation.

Since both the additional light irradiation system 19 and epi-fluorescent device are inserted between the objective lens 4a and the imaging lens, they do not disturb the observer, and the space available can be effectively used. Since light emerging from the objective lens 4a is a collimated light beam (i.e. parallel rays), the addition of the new light irradiation system 19 neither influences the optical performance of the microscope nor disturbs the observation.

In this embodiment, the device arranged on the microscope base 1 is the epi-fluorescent device, and the additional light irradiation system is the caged reagent cleaving device. However, the present invention is not limited to these devices. In place of the light irradiation system, a light-receiving system which detects light coming from a specimen, a simple optical system, and the like may be inserted. More specifically, an epi-illumination device, an epi-illumination device that can change light wavelength, a confocal optical system, a laser irradiation unit, a laser manipulation device, an optical sensor device, an image sensing device, an auto-focus device, a polarizing prism device, a variable magnification optical system, and the like may be combined in correspondence with intended purposes. If the shift amount m of the stage 2 is large, a new third optical system may be inserted in the above-mentioned space. In addition to various optical systems, an objective lens vertical fine moving device or the like may be inserted between the objective lens and revolver.

The insertion position of the spacer member 17 is not limited to that shown in FIG. 2. For example, the spacer member 17 may be inserted between the base 1 and the stage support member 15.

If a plurality of spacer members are prepared, the thickness m can be varied, and spacer members with different thicknesses m may be used in correspondence with the thickness n of the housing of the additional optical system device. A plurality of spacer members may be prepared so that the thickness m of each spacer member may be selected in correspondence with the thickness n of the housing.

Furthermore, the above-mentioned spacer member may consist of a heat insulating member made of, e.g., a synthetic resin or the like. With this arrangement, when a heating stage that keeps a specimen at a preset temperature is used, the heat of the stage can be suppressed from being transferred to the base via the stage support member, and the heat insulating efficiency of the stage can be improved.

Figure 3:
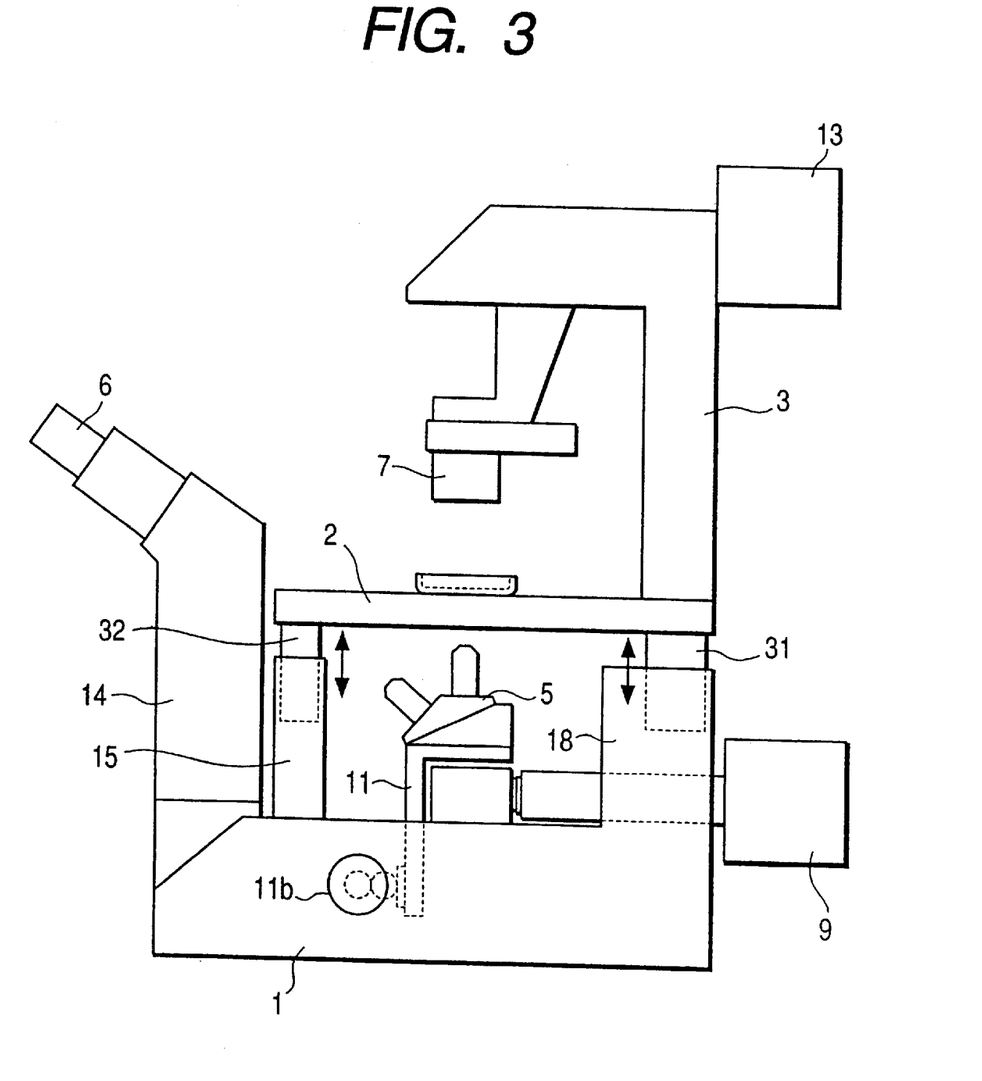
FIG. 3 is a side view showing a modification of the first embodiment.

In this embodiment, the extension/contraction structure of the stage support is not limited to the insertion structure of the spacer member. As a modification, as shown in FIG. 3, the level position of the stage support member may be continuously adjusted. More specifically, the stage support members are formed as respective pairs of relatively slidable members 15 and 32, and 18 and 31. Of these members, the members 15 and 18 are formed as large cylindrical members with guides, and the members 31 and 32 are formed to be slidable along the guides in these cylindrical members 15 and 18. The stage can be vertically moved manually or automatically using a driving device such as a motor. With this arrangement, no spacer members independent from the microscope are required, and extension/contraction of the stage is easy.

In this embodiment, the additional light irradiation system 19 is inserted between the holding portion 5a and the revolver support 11a. However, the present invention is not limited to such specific arrangement. For example, the additional light irradiation system 19 may be inserted between the filter unit 10 and the revolver support 11a. In this case, the focusing member 11 must have a vertical movement stroke that can cover the shift amount m of the level position of the stage 2.

The second embodiment of the present invention will be explained below with reference to FIGS. 4 to 7. The same reference numerals in this embodiment denote the same parts as in FIG. 1.

Figure 4:
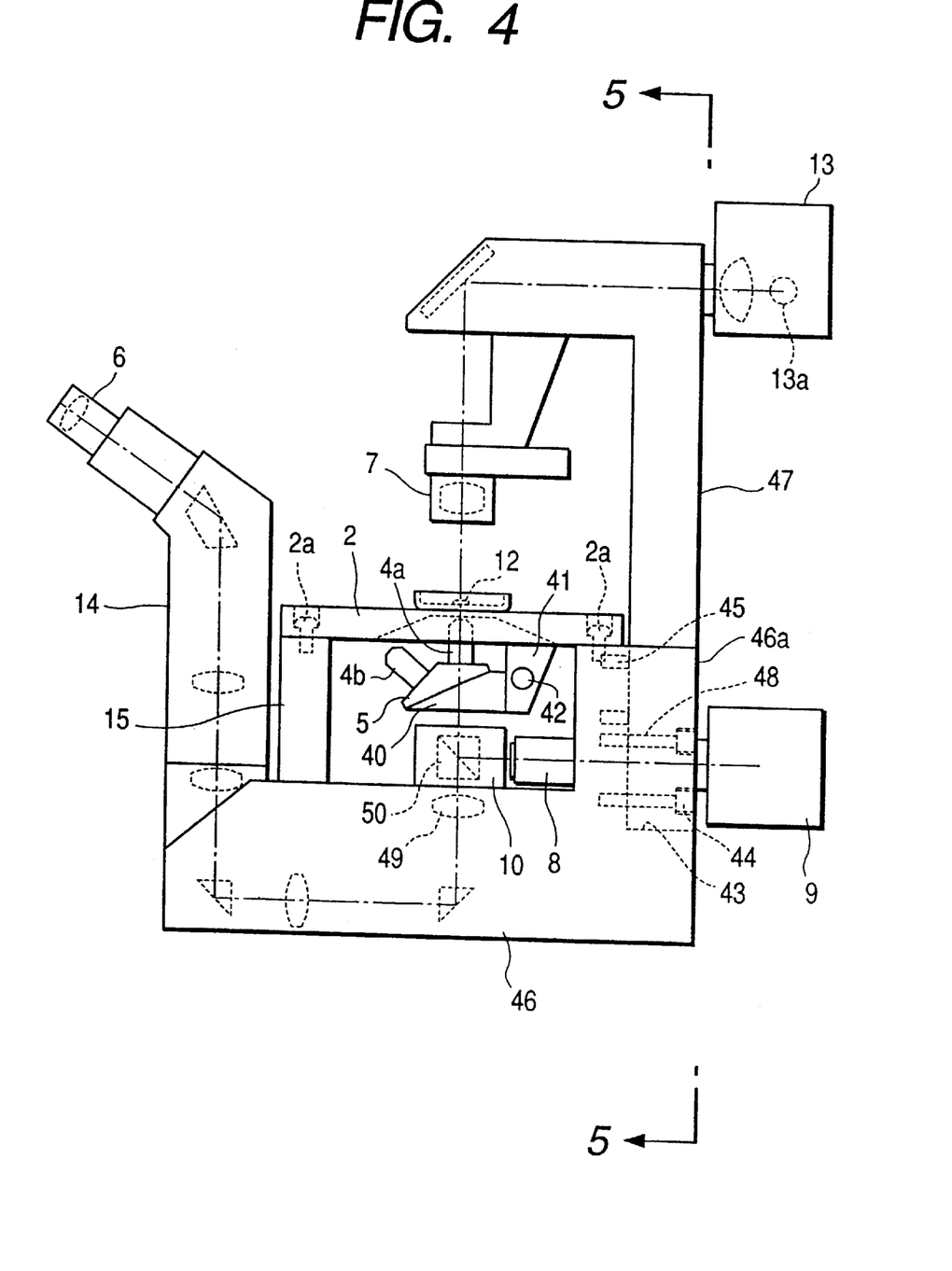
FIG. 4 a side view showing an inverted microscope according to the second embodiment of the present invention.

Light emitted by a light source 13a in a lamp housing 13 is irradiated onto a specimen 12 via a condenser lens 7. Light originating from the specimen 12 is converted into a collimated (or parallel) light beam via an objective lens 4a, and the collimated light beam is imaged by an imaging lens 49 in a microscope base 46 via a filter block 50 in a filter unit 10. This specimen image is observed through an eyepiece 6 via an observation optical system in the base 46 and an eyepiece arm 14.

Since an epi-fluorescent device (8, 9, 10) is the same as that in the first embodiment described above, a detailed description thereof will be omitted.

In this embodiment, a revolver 5 which holds the objective lens 4a and an objective lens 4b is rotatably held by a holding portion 40. The holding portion 40 is attached to the lower surface of a stage 2 via a revolver support member 41. As shown in FIG. 4, the revolver support member 41 is detachably fixed to the lower surface of the stage 2 to depend from the stage 2. Namely, a revolver unit constructed by the revolver support member 41, holding portion 40, and revolver 5 is detachably attached to the lower surface of the stage 2.

A rack & pinion mechanism (not shown) is inserted between the revolver support member 41 and holding portion 40, and is connected to a focusing knob 42 provided to the revolver support member 41. By rotating the focusing knob 42, the holding portion 40 vertically moves together with the revolver 5. With this movement, the objective lens 4a inserted in the microscope optical path is vertically moved with respect to the stage 2 to its in-focus position. The stage 2 can be attached to a stage support member 15 and projection 46a by screws 2a. The projection 46a of this embodiment has the same role as the second stage support member 16 in the first embodiment.

A recess portion 43 that receives a pedestal 57 of the lower portion of an illumination arm 47 is formed in the rear surface of the projection 46a, and eight tap holes (screw holes) 45 are formed in the recess portion 43. The upper four tap holes and lower four tap holes are formed to have predetermined pitches respectively. When four bolts 44 are fastened to the upper or lower four tap holes 45 via holes 48 formed in the pedestal 57, the illumination arm 47 can be attached to the base 46.

Figure 5:
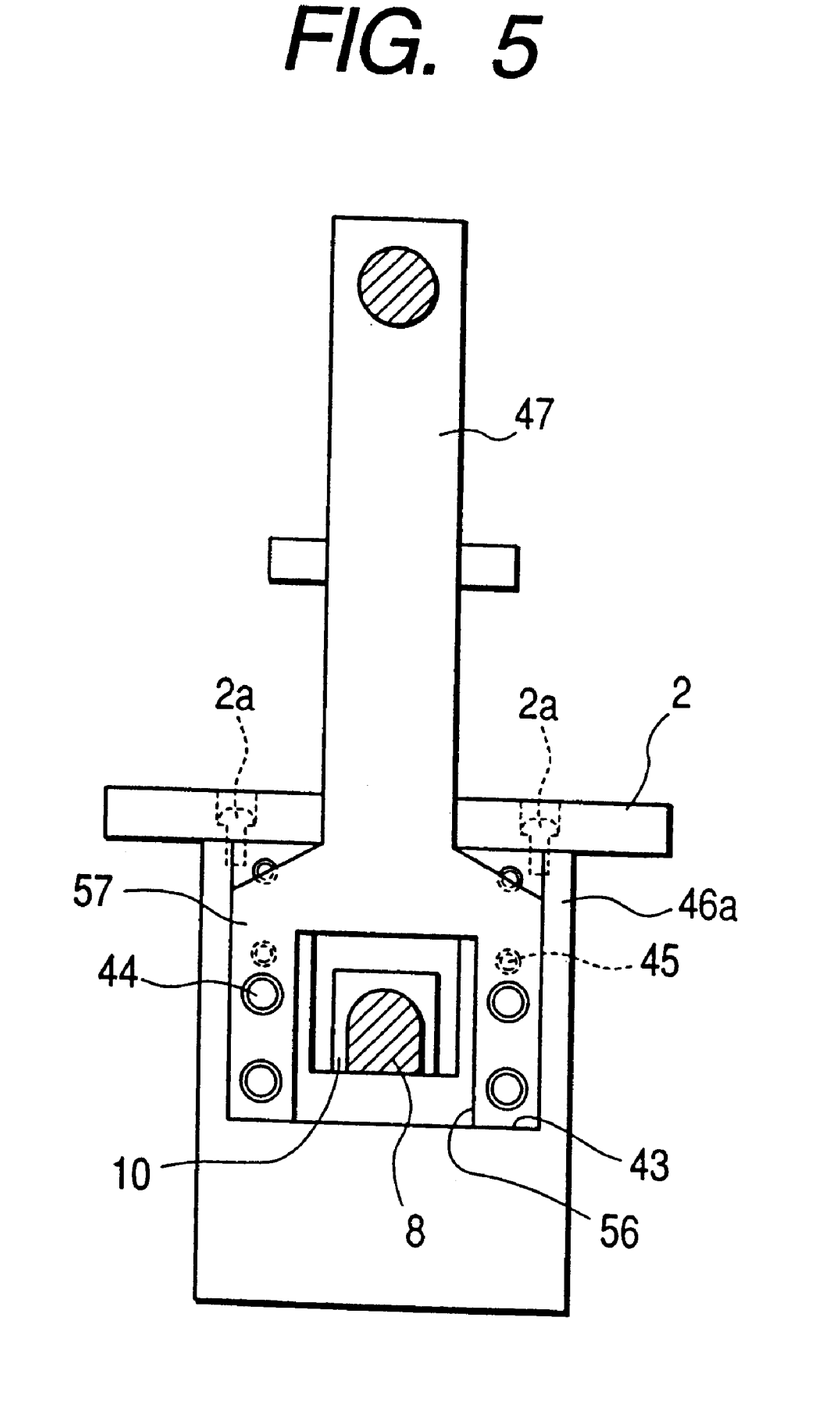
FIG. 5 is a view taken on a line 5—5 in FIG. 4.

As shown in FIG. 5, a rectangular notched portion 56 that assures the optical path of the epi-fluorescent device is formed in the pedestal 57 portion of the lower portion of the illumination arm. Hence, the illumination arm has an inverted Y shape. In FIGS. 4 and 5, the illumination arm 47 is attached to the lower four tap holes 45.

Figure 6:
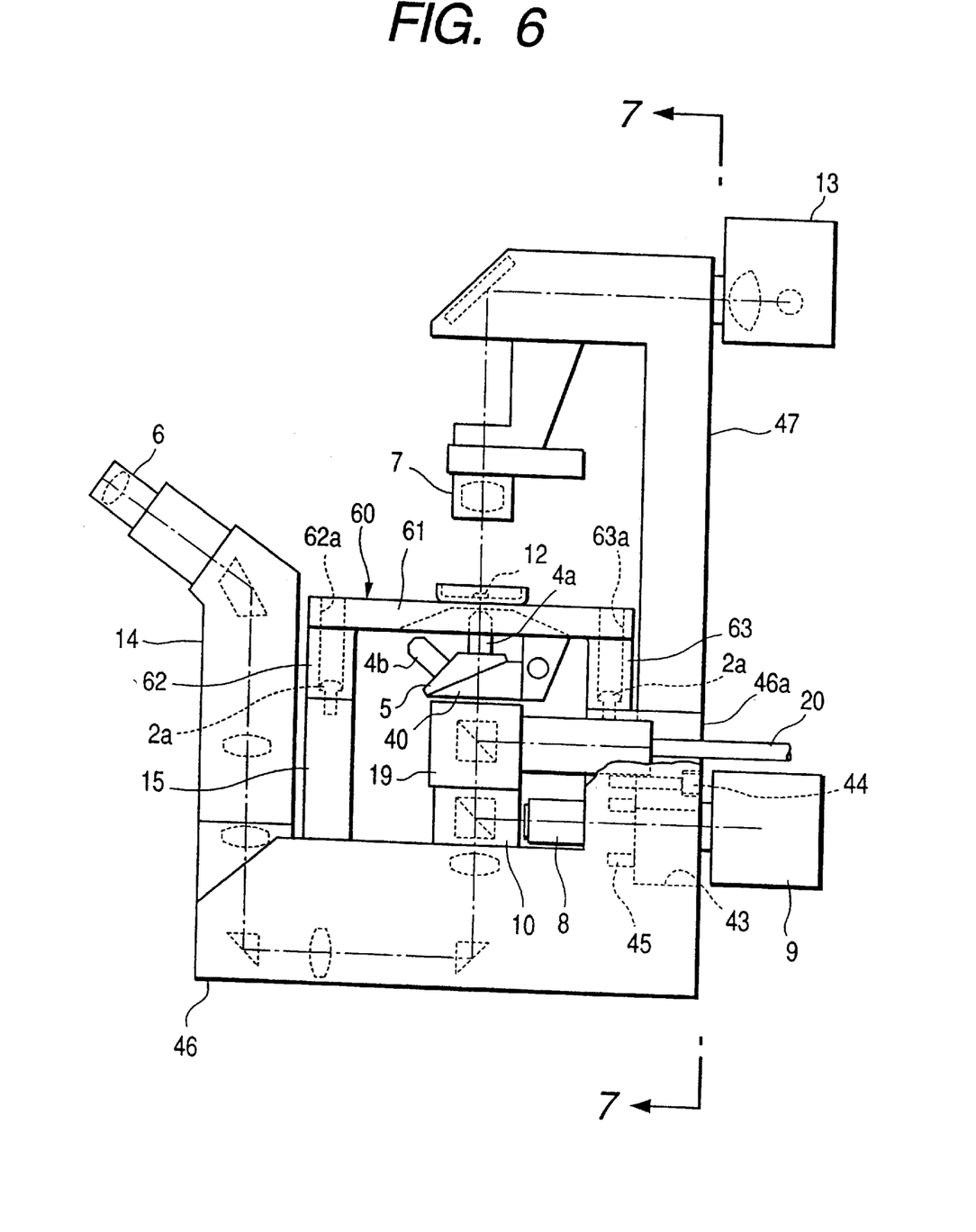
FIG. 6 is side view showing a state wherein a new optical system is added to the inverted microscope of the second embodiment.
Figure 7:
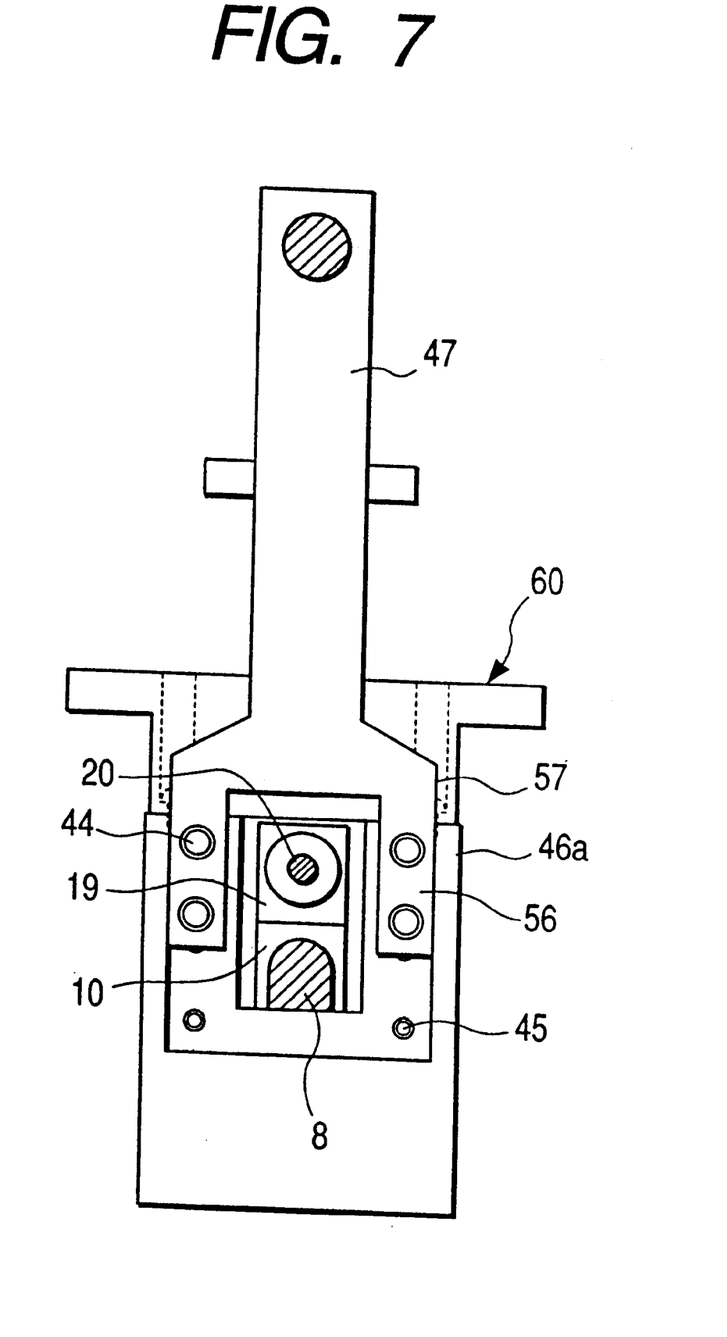
FIG. 7 is a view taken on a line 7—7 in FIG. 6.

A case will be explained below with reference to FIGS. 6 and 7 wherein the level position of the stage is changed, and an optical system other than the filter block 50 is added between the objective lens and the imaging lens. FIG. 7 is a view taken on a line 7—7 in FIG. 6.

The screws 2a are removed to detach the stage 2 from the stage support member 15 and projection 46a. A stage 60 is attached to the stage support member 15 and projection 46a by the screws 2a. This stage 60 is constructed by a flat portion 61, and leg portions 62 and 63 integrally formed at the two ends of the flat portion 61, and has a U-shaped section. Holes 62a and 63a are formed in the stage 60 to extend through the leg portions 62 and 63. The stage 60 is attached to the stage support member 15 and projection 46a by the screws 2a via these holes 62a and 63a. Since the stage having a U-shaped section is used as in this embodiment, the level position of the stage can be easily shifted upward. Such stage structure can also be applied to the first embodiment.

Subsequently, the revolver support member 41 shown in FIG. 4 is detached from the stage 2 together with the holding portion 40 and revolver 5. The lower surface of the flat portion 61 of the stage 60 has an attachment portion of this revolver unit (5, 40, 41). Hence, the revolver unit is attached to the lower surface of the stage 60.

Since the revolver unit is attached to the stage lower surface, even when the level position of the stage is changed, the relative positional relationship between the stage and objective lens remains the same. As a result, the position of the objective lens can be very easily adjusted upon changes in stage position. When a specimen is kept at a given temperature using a heat reversing device such as a heating stage, heat is transferred from the stage (2, 60) to the objective lens 4a via the revolver support member 41, holding portion 40, and revolver 5. Consequently, the objective lens 4a can be set at nearly the same temperature as the stage (2, 60), and the specimen can be observed wile maintaining the specimen at a preset temperature.

Such structure of the revolver unit can also be applied to the first embodiment. When the revolver unit of this embodiment is applied to the first embodiment, the revolver support member 41 may be integrally fixed to the lower surface of the stage 2.

Next, the illumination arm 47 is moved upward by the height (the upward moving amount of the stage) of the leg portions 62 and 63 of the stage 60. The bolts 44 are removed to detach the illumination arm 47 from the projection 46a. The illumination arm 47 is then attached to the upper four tap holes 45 using the bolts 44, as shown in FIG. 7.

Since the illumination arm 47 is vertically movable with respect to the microscope base 46, even when the level position of the stage is changed, the specimen can be maintained in an optimal illumination state by changing the level position of the illumination arm accordingly. In this embodiment, the level position of the illumination arm 47 can be adjusted in two steps. Alternatively, the level position may be adjusted in three or more steps or continuously. Such structure of the illumination arm can also be applied to the first embodiment.

In this state, the level position of the stage is shifted upward, and a new space is formed between the objective lens 4a and filter unit 10. Then, as shown in FIG. 6, an additional light irradiation system (caged reagent cleaving device) 19 is inserted in this space. Since the light irradiation system 19 of this embodiment is the same as that in the first embodiment, a detailed description thereof will be omitted. In this embodiment as well, various other light irradiation systems, a light-receiving system, a simple optical system, and the like may be inserted in place of the caged reagent cleaving device.

The present invention is not limited to the arrangements of the first and second embodiments, and various changes and modifications may be made. In the first and second embodiments, a space for attaching the epi-fluorescent device (8, 9, 10) is assured in advance, and in order to add a light irradiation system to the epi-fluorescent device, the level position of the stage is changed. Alternatively, the space for attaching the epi-fluorescent device need not be assured in advance. More specifically, the level position of the stage corresponds to the height of a space required for the revolver 5, and may be shifted upward when the epi-fluorescent device is attached.

According to the present invention, a structure in which various optical systems can be arbitrarily added in the inverted microscope can be provided, and the range of utilization of the inverted microscope can be broadened.

What is claimed is:

1. An inverted microscope comprising:

a microscope base;

a stage;

an observation optical system;

a stage support structure supporting said stage with respect to said microscope base;

a switching structure having a plurality of objective lenses and capable of inserting one of the objective lenses into an optical path of the observation optical system selectively; and a support structure, one end of which is fixed to a lower surface of said stage, and which supports said switching structure at another end thereof to be movable in an optical axis direction of said one of the objective lenses.

2. An inverted microscope comprising:

a microscope base;

a stage;

an observation optical system;

a stage support structure supporting said stage with respect to said microscope base;

a switching structure having a plurality of objective lenses and capable of inserting one of the objective lenses into an optical path of the observation optical system selectively; and a support structure which is fixed to a lower surface of said stage, and which supports said switching structure for movement in an optical axis direction of said one of the objective lenses.

* * * * *